(12) United States Patent
Johnson

(10) Patent No.: US 7,763,799 B2
(45) Date of Patent: Jul. 27, 2010

(54) WEATHERPROOF COVER AND HINGE ASSEMBLY

(75) Inventor: Steven J. Johnson, Spotsylvania, VA (US)

(73) Assignee: Hubbell Incorporated, Orange, CT (US)

(*) Notice: Subject to any disclaimer, the term of this patent is extended or adjusted under 35 U.S.C. 154(b) by 123 days.

(21) Appl. No.: 11/865,868

(22) Filed: Oct. 2, 2007

(65) Prior Publication Data

US 2008/0223601 A1 Sep. 18, 2008

Related U.S. Application Data

(60) Provisional application No. 60/918,072, filed on Mar. 15, 2007.

(51) Int. Cl.
H02G 3/14 (2006.01)
H05K 5/03 (2006.01)

(52) U.S. Cl. .................. 174/67; 174/53; 174/481; 174/66; 220/3.2; 220/3.3; 220/241; 220/242; 439/142

(58) Field of Classification Search .............. 174/66, 174/67, 53, 50, 57, 58, 480, 481, 56, 54, 174/55; 220/3.2–3.9, 4.02, 241, 242; 248/906; 439/136, 142, 144, 535, 536
See application file for complete search history.

(56) References Cited

U.S. PATENT DOCUMENTS

| | | | |
|---|---|---|---|
| 872,694 A | 12/1907 | Thiem | |
| 2,916,733 A | 12/1959 | Hirsch | |
| 3,564,112 A * | 2/1971 | Algotsson et al. | 174/535 |
| 3,654,663 A * | 4/1972 | Algotsson | 220/3.8 |
| 3,666,134 A * | 5/1972 | Rauch | 174/50 |
| 3,690,035 A | 9/1972 | Schindlauer | |
| 4,634,015 A | 1/1987 | Taylor | |
| 5,148,348 A | 9/1992 | White | |
| 5,228,584 A | 7/1993 | Williams, Jr. | |
| 5,574,255 A | 11/1996 | Simmons | |
| 5,763,831 A | 6/1998 | Shotey et al. | |
| 5,910,642 A | 6/1999 | Daoud | |
| 5,981,875 A | 11/1999 | Kesler et al. | |
| 6,028,268 A | 2/2000 | Stark et al. | |
| 6,570,091 B1 | 5/2003 | Kesler et al. | |
| 6,642,453 B2 | 11/2003 | Shotey et al. | |
| 6,737,576 B1 | 5/2004 | Dinh | |
| 6,770,814 B2 | 8/2004 | Shotey et al. | |
| 6,770,815 B1 | 8/2004 | Shotey et al. | |
| 6,770,816 B2 | 8/2004 | Shotey et al. | |
| 6,891,104 B2 | 5/2005 | Dinh | |
| 6,921,861 B1 | 7/2005 | Gretz | |
| 6,960,721 B2 | 11/2005 | Shotey et al. | |
| 6,987,225 B2 | 1/2006 | Shotey et al. | |
| 7,033,040 B2 | 4/2006 | Spahr et al. | |

(Continued)

Primary Examiner—Angel R Estrada
(74) Attorney, Agent, or Firm—Alfred N. Goodman; Mark S. Bicks; Garrett V. Davis

(57) ABSTRACT

A cover assembly for attaching to an electrical box includes a base plate, a body and a cover hinged to the body. The assembly is mounted to the electrical box to protect an electrical device from moisture while allowing access to the electrical device. Hinge members are provided that are inserted into a slot on a selected side of the cover and base to enable the cover assembly to be oriented in a horizontal or vertical direction with the cover being pivotally mounted along a horizontal axis.

21 Claims, 5 Drawing Sheets

U.S. PATENT DOCUMENTS

| | | |
|---|---|---|
| 7,067,738 B1 | 6/2006 | Shotey et al. |
| 7,071,415 B1 | 7/2006 | Shotey et al. |
| 7,119,277 B1 | 10/2006 | Shotey et al. |
| 7,119,278 B1 | 10/2006 | Shotey et al. |
| 7,176,379 B2 | 2/2007 | Shotey et al. |
| 7,230,184 B1 | 6/2007 | Shotey et al. |
| 7,282,643 B2 | 10/2007 | Maltby et al. |
| 7,304,237 B1 | 12/2007 | Shotey et al. |
| 7,304,238 B1 | 12/2007 | Shotey et al. |
| 7,323,639 B1 | 1/2008 | Shotey et al. |
| 7,345,238 B1 | 3/2008 | Shotey et al. |
| 7,348,486 B1 | 3/2008 | Shotey et al. |
| 7,368,662 B1 | 5/2008 | Shotey et al. |
| 7,396,996 B1 * | 7/2008 | Shotey et al. .................. 174/67 |
| 7,396,997 B2 * | 7/2008 | Dinh .......................... 174/67 |
| 7,410,372 B2 * | 8/2008 | Johnson et al. ................ 174/66 |
| 7,439,444 B1 * | 10/2008 | Maltby et al. .................. 174/66 |
| 7,462,777 B2 * | 12/2008 | Dinh .......................... 174/58 |
| 7,479,598 B1 * | 1/2009 | Shotey et al. .................. 174/58 |
| 7,482,537 B1 * | 1/2009 | Shotey et al. .................. 174/67 |
| 2006/0231282 A1 | 10/2006 | Greenfield |

\* cited by examiner

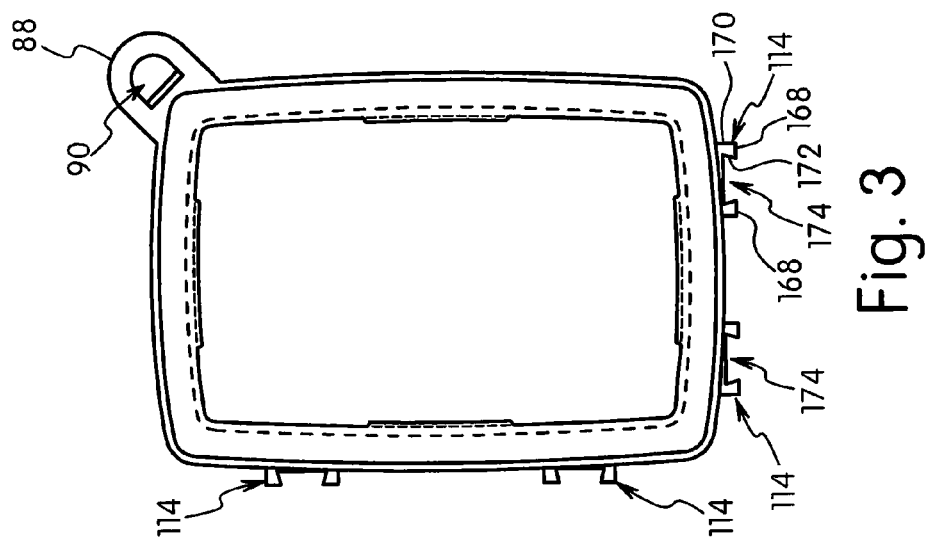
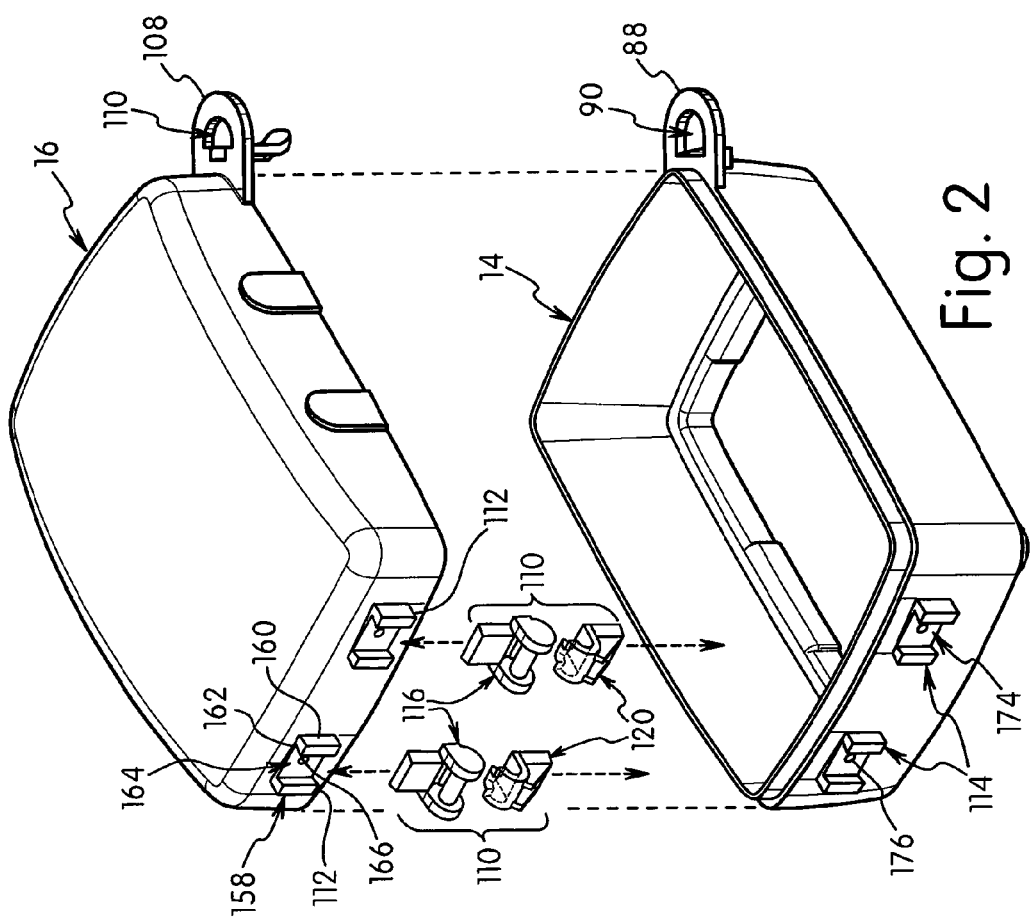

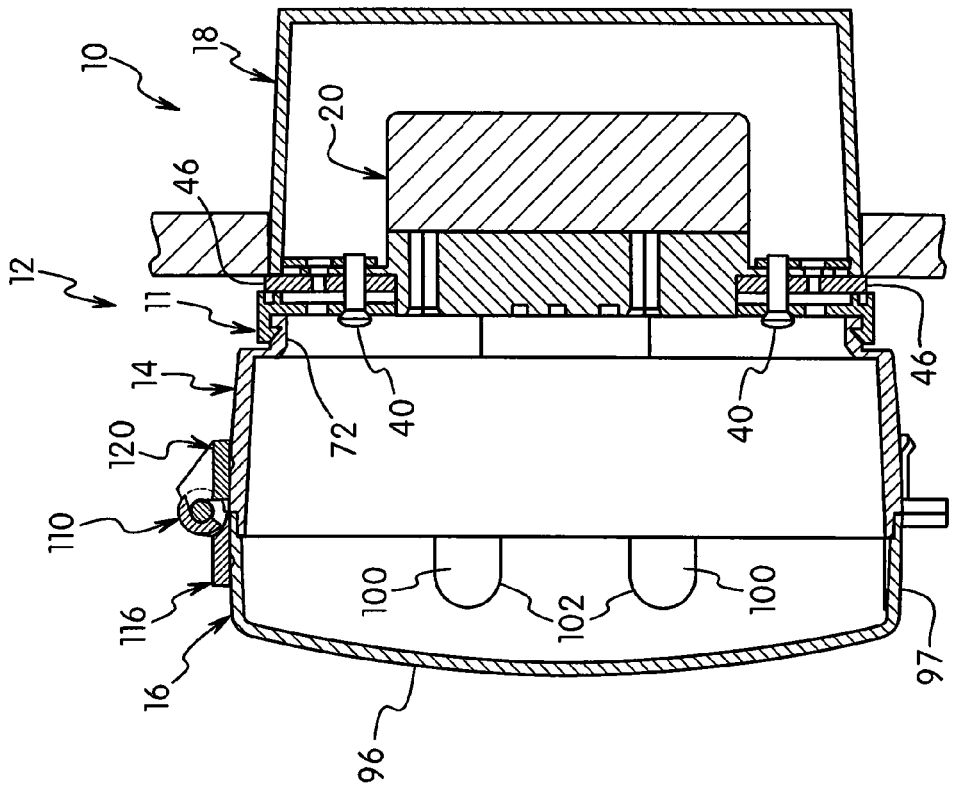
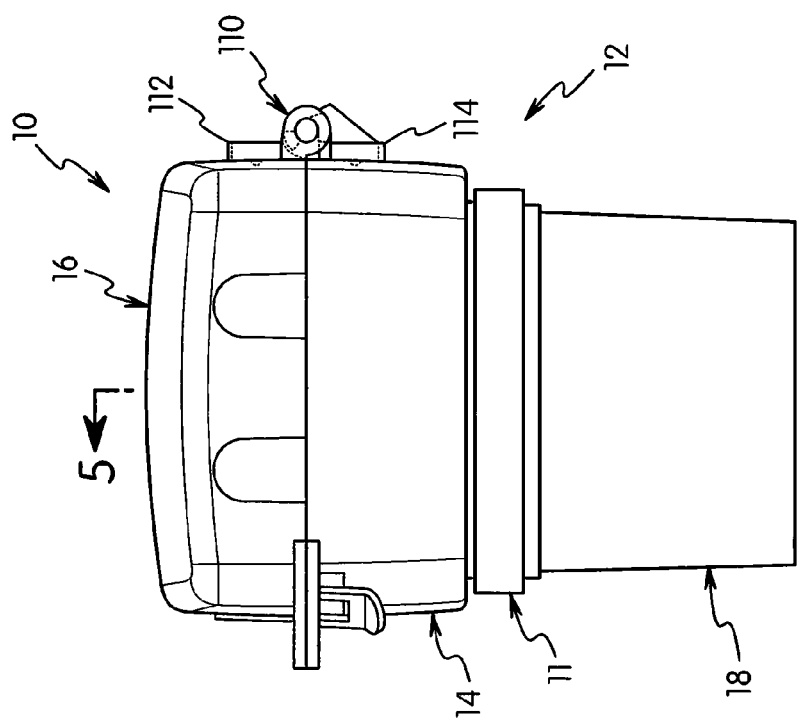
Fig. 5
Fig. 4

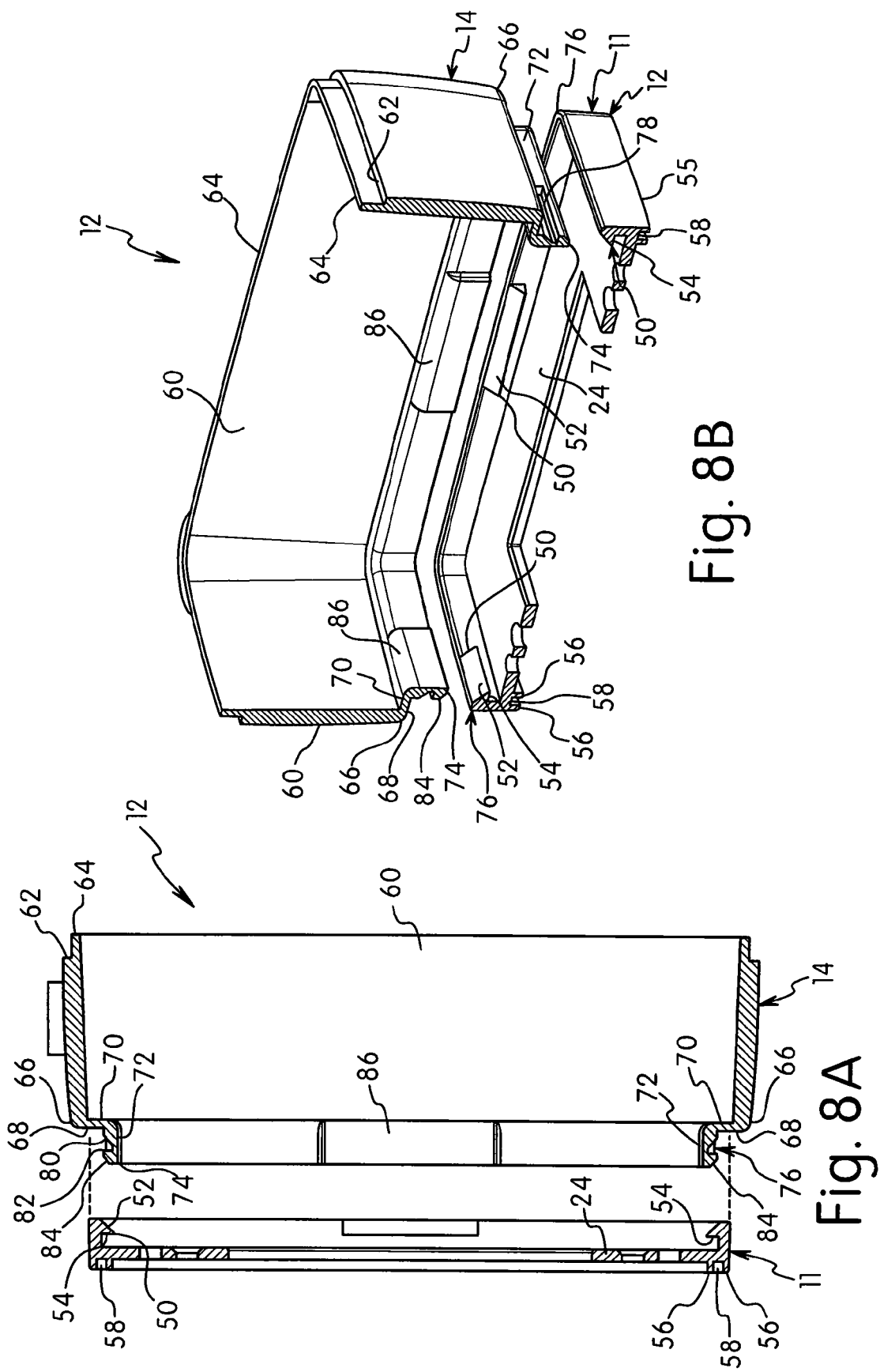

WEATHERPROOF COVER AND HINGE ASSEMBLY

This application claims the benefit under 35 U.S.C. §119 (e) of U.S. Provisional Application Ser. No. 60/918,072, filed Mar. 15, 2007, which is hereby incorporated by reference in its entirety.

FIELD OF THE INVENTION

The present invention is directed to weatherproof cover assembly for use with an electrical outlet box. The invention is further directed to a weatherproof cover assembly having removable hinges that can be attached to coupling members on different sides of the base to enable the cover to pivot in two alternate directions so the cover assembly and electrical box can be mounted in a generally horizontal direction or in a generally vertical direction with respect to a longitudinal dimension of the cover assembly.

BACKGROUND OF THE INVENTION

Electrical boxes are commonly mounted to a stud or other support structure for supporting an electrical device and enclosing electrical wiring. The electrical boxes are often mounted in a variety of positions and locations in the wall or floor for interior and exterior use.

Exterior electrical boxes and switches require a cover to protect the electrical device from the rain. In recent years it has been desirable to provide a cover for the electrical device that can be used while an electrical plug, wire or the like is connected to the electrical outlet where the cover can close over the plug or wire without interfering with the cover.

Although building codes may vary between areas, most codes require the cover to be self-closing so that cover will automatically close around the electrical device when released. The cover is either spring biased or gravity operated. The gravity operated covers are often preferred since they eliminate additional parts and springs and are less likely to malfunction.

The gravity operated devices require the hinge to be located along an upper edge portion of the body or mounting face plate so that the cover will pivot downwardly to a closed position by the weight of the cover. The body of the assembly is often constructed to have a removable face plate for attaching the front side of the body and to the electrical device. The removable face plate can be replaced with another face plate having an opening oriented to accommodate the electrical device so that the cover is oriented to close by the weight of the cover. Examples of cover assemblies having a removable plate are disclosed in U.S. Pat. No. 5,280,135 to Berlin. In this device, one removable plate can be replaced with a different plate where each plate has a different shaped opening to accommodate different electrical devices.

Another construction of cover assemblies that can be mounted in different orientations has a hinge member on two adjacent sides of the body and two adjacent sides of the cover. The body and cover can be oriented in the selected horizontal or vertical position and the appropriate members are coupled together. The hinge members that are not being used can be removed and separated from the body and cover. Examples of this type of cover are disclosed in U.S. Pat. No. 6,891,104 to Dinh, U.S. Pat. No. 6,987,225 to Shotey, U.S. Pat. No. 4,874, 906 to Shotey and U.S. Pat. No. 4,803,307 to Shotey.

Another cover assembly is disclosed in U.S. Pat. No. 6,133, 531 to Hayduke. This assembly includes a body portion and a hinged cover. The hinge is mounted on a corner between two adjacent sides of the cover and body so that the cover pivots along an axis that is diagonal with respect to the longitudinal dimension of the cover and body. The cover and body can be mounted in a horizontal or vertical orientation so that the cover will close by the weight of the cover.

While each of the prior devices has been generally suitable for the intended purpose, there is a continuing need in the industry for an improved device for mounting an electrical component to an electrical box.

SUMMARY OF THE INVENTION

The present invention is directed to a weatherproof assembly for an electrical device such as an electrical receptacle or switch. The invention is particularly directed to a cover assembly that can be coupled directly to an existing electrical box or electrical device and is suitable for exterior use. The cover assembly of the invention for use with an electrical box includes a base, a cover and at least one hinge that can be attached to a coupling member on the surface of a selected side of the base and cover so the cover can pivot along a horizontal axis in different orientations of the base and the corresponding electrical box whereby the cover closes by gravity.

The present invention provides an electrical box cover assembly that can be attached to an electrical box to enclose an electrical device. The invention also provides a cover assembly for an electrical box having a cover that can be pivotally attached to a base by separable hinge member that can be selectively coupled to an outer surface of a desired side of the cover member and the base.

One feature of the cover assembly has a base formed from a body and a separate mounting or base plate where the body attaches to the base plate. The base plate has one or more openings to receive an electrical device such as a duplex receptacle or switch. The body has a dimension to enclose the electrical device and wires or plugs connected to the electrical device.

Another aspect of the invention provides a weatherproof outlet cover assembly having a cover that can be mounted to the base to pivot along one of two different sides of the base. In one embodiment, the two different sides are substantially perpendicular so that the cover can pivot along different axes along the two sides. The body of the base and the cover member include coupling members for coupling with a hinge member to pivotally connect the cover member to the base. The coupling members in one embodiment are integrally formed on the outer side surface of the base and cover member. The hinge members are coupled to the selected coupling member to determine the pivot axis of the hinge member and the cover member with respect to the base. The cover member and the base typically have two coupling members on each of the adjacent sides to receive two hinge members.

The present invention provides an electrical box cover assembly that can be attached to an electrical box to enclose an electrical device. The invention is also directed to a cover assembly for an electrical box having a pivotally mounted cover and a removable base that allows the assembly to accommodate various electrical devices.

One feature of the cover assembly has a base including a body and a removable mounting base coupled to a bottom end of the body. The mounting base has one or more openings to receive an electrical device such as a duplex electrical outlet or switch.

Another aspect of the invention is to provide a weatherproof outlet cover assembly having a cover that can be mounted to the base to pivot along two different axes. The cover assembly has a body with hinges on a top wall and a side wall. The cover and base have two coupling members for attaching hinge members to connect the cover to the base.

A further aspect of the invention is to provide a weatherproof electrical box cover assembly having a body, and a base plate that snaps over the bottom end of the body. The base plate has a flange on its outer edge to define an open top end. The bottom end of the body is received in the open end of the base plate to form a weatherproof seal between the body and the base plate. The base plate fits over and snaps onto the bottom end of the body. A weatherproof seal or gasket can be included between the opposing surfaces of the body and the base plate.

The invention is also directed to a cover assembly having a cover pivotally connected to a body and a plurality of base plates that can be selectively attached to a bottom end of the body. Each base plate has a different shaped opening for selectively receiving a particular electrical device.

A further feature of the invention is to provide a cover assembly having a body with an open bottom end and a mounting base coupled to a body by a snap connection. In one embodiment, the snap connection includes a detent or hook-like member extending inwardly from the mounting base and the outer surface of the body includes a recess complementing the detent.

In one embodiment of the invention, the cover assembly includes at least one and typically two hinge members that are separate from the base and cover member and can be attached to the outer surface of the base and cover member. During use, the hinges are attached to the selected side of the base and cover member to enable the cover to pivot with respect to the base along the desired side of the base and cover member.

The hinge member has two hinge portions defining first and second hinge leaves that are connected to together by a hinge pin and hinge barrel to enable the two hinge portions to pivot with respect to each other. The hinge leaves in one form of the invention have a substantially flat, planar shape with a dimension that can be attached to the outside of the cover member and base. The hinge leaves can be attached to the cover member and base by a number of suitable means on the face of the cover member and base although a mechanical fastener with complementing coupling members is generally preferred.

Another aspect of the invention is to provide a cover member and base having an opening or slot, such as a dovetail slot that is able to receive and mate with the hinge portions of the hinge member for coupling the hinge member to the cover member and base. The slots are typically provided on two adjacent sides of the cover member and base. In an alternative embodiment the hinge members define female coupling members, and the cover and base are provided with male coupling members suitable for coupling with the hinge members. The hinge member or members are coupled to the selected sides of the cover member and base to enable the cover member to pivot along a horizontal axis with respect to the base while enabling the base to be oriented in a generally horizontal or vertical position. In one embodiment, the openings or slots have a longitudinal dimension that extends in a plane parallel to the side portion of the base and cover.

The various aspects of the invention are can be attained by providing an electrical device cover assembly including a base having a top end and a bottom end adapted for coupling to an electrical device or electrical box, a cover member adapted for mating with the top end of the base, and at least one hinge member adapted for coupling to the cover member and the base for pivotally coupling the cover member to the base. In one embodiment the hinge member is removably coupled to a coupling member on the cover member and the base.

The various aspects and features of the invention are also attained by providing a cover assembly for an electrical device where the cover assembly includes a base, a cover and a hinge member. The base has a top portion, a bottom portion, a side portion and a slot defining a first coupling member on the base. The cover member is adapted for mating with the top portion of the base and has a side portion with a first coupling member. The hinge member has a first hinge portion for removably coupling to the slot in the base, and a second hinge portion for removably coupling to the slot in the cover member to provide a hinge connection to pivotally couple the cover member to the base.

The various aspects of the invention are also attained by providing a cover assembly including a base having a top end, a bottom end, a first side and a second side oriented substantially perpendicular to the first side where the first side has at least one coupling member on a first outer side surface of the base and a second side having at least one coupling member on a second outer surface of the base. The coupling members are in the form of a slot lying in a plane substantially parallel to the respective side surface. A cover member has a shape complementing the shape of the base, and has a first side with a coupling member and second side with a coupling member where the second side is oriented substantially perpendicular to the first side. A hinge member is provided having a first hinge portion and second hinge portion pivotally connected together. The first hinge portion is adapted for selectively coupling to either the coupling member of the first side of the base or to the coupling member of the second side of the base. The second hinge portion is adapted for selectively coupling to either the coupling member on the first side of the cover member or to the coupling member on the second side of the coupling member whereby the cover can pivot with respect to the base along either the first side of the cover member and the base or along the second side of the cover member and the base.

These and other aspects and salient features of the invention will become apparent from the following detailed description of the invention, which taken in conjunction with the annexed drawings, disclose various embodiments of the invention.

BRIEF DESCRIPTION OF THE DRAWINGS

The following is a brief description of the drawings, in which:

FIG. 2 is an exploded view of the cover assembly;

FIG. 3 is a top plan view of the body of the cover assembly of FIG. 1;

FIG. 4 is an elevational end view of the cover assembly;

FIG. 5 is a cross-sectional view of the cover assembly taken along line 5-5 of FIG. 4;

FIGS. 8A and 8B are cross sectional views of the base and body of the cover assembly.

DETAILED DESCRIPTION OF THE INVENTION

The present invention is directed to a cover assembly for enclosing an electrical device such an electrical receptacle and wires or plugs connected to the electrical device. More particularly, the invention is directed to a cover assembly that can be attached to an electrical box and provide a substantially weather resistant cover for exterior use.

Figure 1:
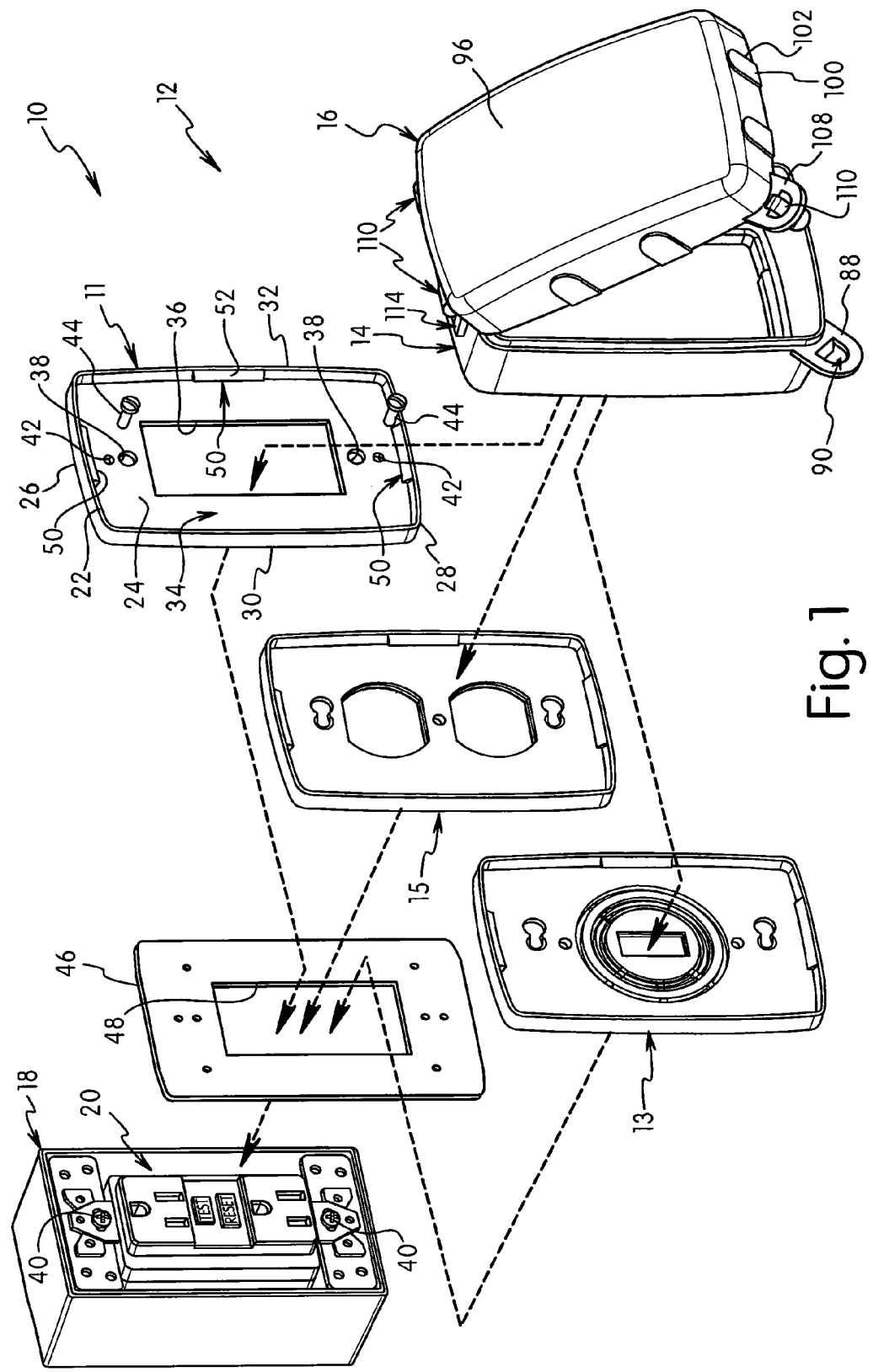
FIG. 1 is an exploded perspective view of the cover assembly of an embodiment of the invention.

The cover assembly 10 of the invention basically includes a base 12 and a cover 16. Base 12 in one embodiment is formed by a body 14 and base plate 11 that attaches to body 14. In another embodiment, base 12 can be an integrally formed one piece unit. As shown in FIG. 1, the assembly 10 is connected to an electrical box 18 that supports an electrical device 20 such as an electrical duplex receptacle. The electrical box 18 can be a standard electrical box that can be mounted to a post or other support surface by a fastener extending through a side wall or back wall of the electrical box. The electrical box 18 can also be mounted within a wall structure so that the front edge of the electrical box is substantially flush with the outer surface of the wall. Electrical wiring (not shown) is connected to the electrical receptacle 20 as known in the art.

In one embodiment of the invention, the weatherproof cover assembly is a kit of unassembled components that include base plates 11, 13, 15 and the body 14 and cover 16. As shown in FIG. 1, the different base plates are provided to accommodate different electrical devices mounted in the electrical box 18. For example, base plate 11 accommodates the electrical receptacle 20, base plate 13 accommodates a switch and base plate 15 accommodates a standard duplex receptacle. For purposes of discussion, base plate 11 will be discussed in connection with the various embodiments of the invention. It will be understood that the base plate 11 can be substituted by a similar base such as base 13 and 15.

Base 12 has a dimension complementing the shape of electrical box 18 for attachment to the electrical box or the electrical device mounted in the electrical box. Base plate 11 has a flange 22 defining a side wall extending in an axial direction. In the embodiment illustrated, base plate 11 has a bottom wall with top and bottom side edges 26 and 28 and opposite side edges 30 and 32 extending perpendicular to top and bottom edges. Flange 22 extends around the peripheral edge of bottom wall 24 in a direction substantially perpendicular to the plane of bottom wall 24. In the embodiment illustrated in FIG. 1, base plate 11 has a substantially rectangular configuration to accommodate a single electrical device. In other embodiments, base plate 11 can have a substantially square configuration to accommodate a two gang electrical box. In still further embodiments, base plate 11 can have a suitable dimension to accommodate a multi-gang electrical box as needed.

In the embodiment illustrated, flange 22 is continuous around the peripheral edge of bottom wall 24 to define an open top end 34 of base plate 11. Flange 22 generally has a shape to correspond to the shape of the base plate 11. In the embodiment illustrated the base plate 11 and flange 22 have a generally rectangular shape with corresponding side portions that mate with body 14. In one embodiment, the side portions of flange 22 have a slight curved shaped corresponding to the shape of the body 14. In other embodiments, flange 22 can be discontinuous depending on the intended use of the assembly. Generally, a continuous flange 22 as shown is preferred to provide a weather-tight seal between base plate 11 and body 14.

Bottom wall 24 of base plate 11 includes at least one opening 36 for receiving electrical receptacle 20. Opening 36 can be any suitable shape needed to accommodate the electrical receptacle 20. In one embodiment bottom wall 34 is integrally formed with base plate 11 and flange 22. In other embodiments, a separate plate can be attached to base plate 11 having an opening to accommodate the electrical device 20.

Apertures 38 are provided in bottom wall 24 to receive a screw 40 to couple base plate 11 to electrical receptacle 20 and electrical box 18. Screw 40 in the embodiment shown is a screw that attaches electrical receptacle 20 to electrical box 18. Circular apertures 42 are formed in bottom wall 24 to receive a faceplate screw 44 that is threaded into a mounting flange of electrical receptacle 20.

In the embodiment illustrated, a gasket material 46 is provided between electrical box 18 and base plate 11 to form a weather tight seal. In the embodiment illustrated, gasket 46 is formed from a sheet material having an outer dimension to contact the outer edges of electrical box 18 and having a central opening 48 to receive the face of electrical receptacle 20. Typically, gasket 46 is formed from a flexible and resilient plastic material capable of forming a weatherproof seal between electrical box 18 and base plate 11.

Referring to FIGS. 1 and 5, each side edge of flange 22 includes a hook-shaped coupling member 50 extending inwardly from flange 22 in a direction toward a center of base 12. As shown in FIGS. 1 and 8B, each longitudinal side and each transverse side of flange 22 includes an inwardly extending hook member 50. Hook member 50 has an inclined top surface 52 and a substantially flat bottom surface 54 extending substantially perpendicular to the plane of flange 22. Bottom surface 54 of each flange is substantially parallel to bottom wall 24. In the embodiment illustrated, hook member 50 is positioned in a center portion of each side of flange 22 and has a length less than the length of each side of flange 22. Hook member 50 has a dimension to couple base plate 11 with body 14 as discussed hereinafter in greater detail.

Referring to FIGS. 8A and 8B, bottom wall 24 of base plate 11 has a ridge 53 extending parallel to the side wall of base plate 11 and having a substantially flat bottom surface 55 with elongated recesses 58 that extend in a longitudinal direction with respect to each side of base plate 11. The recesses 58 extend along the side edges of base and form a pair of spaced-apart ribs 56. The inner rib is substantially straight while the outer rib is slightly curved. The recesses 58 terminate a short distance from each corner of base plate 11. The bottom surface 55 of ridge 53 contacts gasket 46 to compress gasket 46 against electrical box 18 to assist in forming a weatherproof seal.

Body 14 includes a plurality of side walls 60 that complement the side edges of base plate 11 and flange 22. Side walls 60 have a height to accommodate electrical plugs and wires to be enclosed by cover assembly 10. Body 14 has an open top end and an open bottom end that form a through passage. Referring to FIGS. 8A and 8B, side walls 60 have a top edge 62 and a lip 64 extending in a direction parallel to the plane of side walls 60. In a preferred embodiment, lip 64 extends around the perimeter of body 14 and is positioned adjacent the inner surface of side walls 60.

Side walls 60 have a bottom edge 66 opposite top edge 62. Bottom edge 66 defines a shoulder 68 that extends in a generally inward direction with respect to a center of body 14. Shoulder 68 in one embodiment extends inwardly a distance to form a bottom wall portion 70 of body 14 extending inwardly from side wall 60. A lip 72 extends in a generally downward direction from an inner edge of shoulder 68 in a plane substantially parallel to side walls 60. In a preferred embodiment, lip 72 is continuous and extends around the peripheral edge of body 14. Lip 72 has a length corresponding substantially to the length of flange 22 so that lip 72 is received in open top end 34 of base 12. Lip 72 has an outer end 74 that contacts bottom wall 24 when base 12 is coupled to body 14 to assist in forming a weatherproof seal between body 14 and base 12. In one preferred embodiment, outer end 74 of the flange forms a continuous edge to form a seal between body 14 and base plate 11. Preferably the seal extends around base plate 11 and body 14 to inhibit moisture penetration into the body. Flange 22 of base 12 has a top end 76 that opposes shoulder 68 when base 12 is coupled to body 14. In the embodiment shown in FIG. 5, top end 76 is spaced from shoulder 68. In alternative embodiments, top end 76 can contact shoulder 68 to assist in forming a weatherproof seal between base plate 11 and body 14.

Lip 72 of body 14 has an outwardly facing recess 78 in each side portion to form a coupling member for coupling with a corresponding hook member 50 to couple body 14 to base plate 11 by a snap connection. Each recess 78 has a length and width to accommodate the corresponding hook member 50 and typically has a length less than the length of the side portion of lip 72. Recess 78 has a shape complementing hook member 50 to secure base plate 11 to body 14. In the embodiment illustrated, recess 78 has a substantially triangular concave shape with an inclined upper face converging to a bottom face 82 which extends in a plane substantially perpendicular to the plane of lip 72. Preferably, recess 78 is spaced from outer end 74 of lip 72 so that outer end 74 contacts bottom wall 24 of base plate 11 when base plate 11 is coupled to body 14. Outer end 74 of lip 72 in the embodiment illustrated is formed with an inclined edge 84 to form a cam surface to allow lip 72 to slide past each hook member 50 to an assembled position. As shown in FIG. 8B, the inner surface of lip 72 is provided with a projecting portion 86 extending inwardly to accommodate the depth of recess 78 without reducing the strength of lip 70 and without hindering the coupling of hook member 50 with recess 78.

Base 12 is formed by attaching base plate 11 onto body 14 by hook members 50 and recesses 78. The lip 72 of body 14 extends in a generally axial direction and is dimensioned to fit within the open top end of flange 22 of base plate 11. In this manner, flange 22 of base plate 11 fits over lip 72 of body 14. The inclined edge 84 initially contacts the inclined top surface 52 of each coupling member 50 during insertion of lip 72 into the open end of flange 22. A force applied against base plate 11 causes the side portions of flange 22 to flex outwardly a distance to enable lip 72 to slide past hook members 50. Hook members 50 then snap into the respective recess 78. The opposing inclined surfaces 80 of recesses 78 and 52 of hook member 50 contact each other while the flat surfaces 82 of recesses 80 and 54 of hook member 50 engage each other to prevent separation of base plate 11 from body 14.

Base plate 11 and body 14 are preferably made of a plastic material that enables the components to snap together. The base plate 11 and body 14 can be separated using a suitable tool to pry flange 22 away from lip 72 a distance to release the coupling member 50 from the respective recess 58. In this manner, base plate 11 can be removed and substituted for a base having a different opening to accommodate a different electrical device.

Referring to FIGS. 2 and 3, a corner of body 14 includes a tab 88 having an aperture 90 for a locking cover 16 in a closed position by passing the shank of a lock through aperture 90. A first side wall of body 14 is provided with first coupling members 114 positioned adjacent the top edge of side wall 60. In the embodiment illustrated, coupling members 114 for receiving a hinge member 110 are positioned on the longer side wall of body 14 and spaced apart a distance to hinge cover 16 to body 14 and allow cover 16 to pivot between open and closed positions. In alternative embodiments, a single coupling member can be provided on side wall 60. An adjacent side wall is provided with a second coupling member 114 for receiving a hinge member 110.

Cover 16 has a front wall 96, a top wall 95, a bottom wall 97 and side walls 98 with a dimension corresponding to the dimensions of body 14. One of the side walls 98 is formed with substantially U-shaped knock outs 100 and frangible lines 102 to form openings to allow electrical wiring to exit cover 16 when in the closed position. In one embodiment removable tabs can be inserted into U-shaped recesses to close the recesses when not in use.

Cover 16 includes a tab 108 extending diagonally from a corner. Locking tab 108 includes an aperture 110 for receiving a lock to lock cover 16 in the closed position. Locking tab 108 aligns with one of the locking tabs 88 regardless of which hinges are being used so that cover 16 can be locked to body 14.

The cover assembly 10 includes coupling members for receiving hinge members 110 for coupling the cover member 16 to the base 12 to enable the cover member 12 to pivot with respect to the base 12 along either of two adjacent sides of the cover member 16 and the base 12.

In one embodiment as shown in FIG. 2, the hinge members 110 are formed as a separate assembly that are independent of the cover member 16 and the base 12. Each hinge member 110 is coupled to the base 12 and to the cover member 16 by a coupling member 112 on cover member 16 and coupling member 114 on base 12. In the illustrated embodiment of the invention, coupling member 114 is provided on body 14. In alternative embodiments, base 12 can be a base plate 11 alone without the body 14 attached to the base plate 11. In this embodiment the base plate is a cover plate or face plate that attaches directly to the electrical box.

Referring to FIGS. 6A-6C and 7A-7C, the hinge member 110 has a first hinge portion 116 defining a first hinge leaf 118 or hinge half and a second hinge portion 120 defining a second hinge leaf 122 or hinge half. The first and second hinge leaves 118 and 122 are coupled together by a hinge pin 124 for forming the hinge member 110. In the embodiment shown, the first hinge leaf 118 has a substantially planar configuration with a substantially flat top surface 126 and a substantially flat bottom surface 128. A first end 130 of the hinge leaf 118 includes a pair of parallel legs 132 extending upwardly from the hinge leaf 118 and perpendicular to the plane of the hinge leaf 118. Hinge pin 124 extends between the legs 132 to define the pivot point between the two hinge leaves. In the embodiment illustrated, the first hinge leaf 118 has side edges 134 that are inclined at an angle to form a dovetail shape to mate with the coupling members on the cover member and/or base as discussed hereinafter in greater detail. The bottom surface 128 of the first hinge leaf 118 has a detent 133 in the form of a dimple to mate with a complementing recess in the respective coupling member of the cover member and/or base.

The second hinge leaf 122 also has a planar shape with a top surface 136 and a bottom surface 138 with inclined side edges 140 to form a dovetail shape. A detent 142 in the form a dimple is formed on the bottom surface 138 of the hinge leaf 122. A first end 144 of the second hinge leaf 122 includes a hinge barrel 146 for coupling with the hinge pin 124 of the first hinge leaf 118.

Figure 7A:
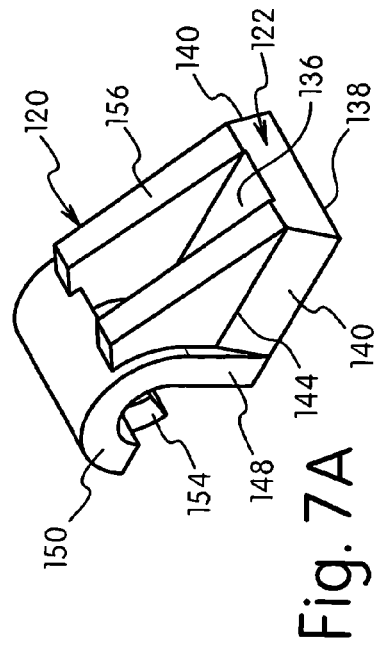
FIGS. 7A, 7B and 7C are perspective, side and end views, respectively, of the hinge member showing the hinge barrel.
Figure 7B:
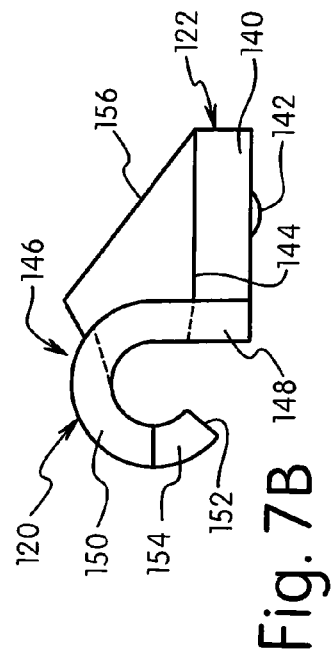
Figure 7C:
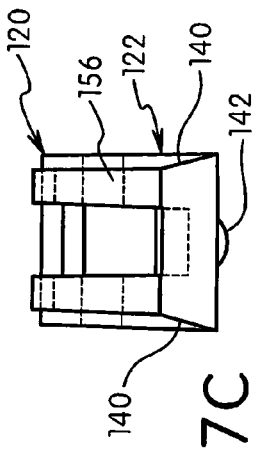
Figure 6A:
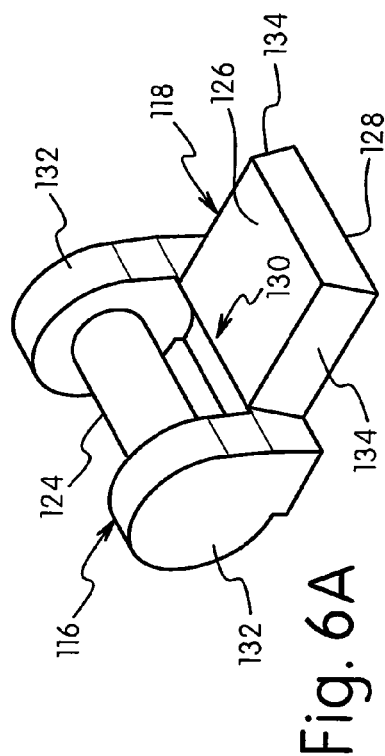
FIGS. 6A, 6B and 6C are perspective, side, and end views, respectively, of the hinge member showing the hinge pin.
Figure 6B:
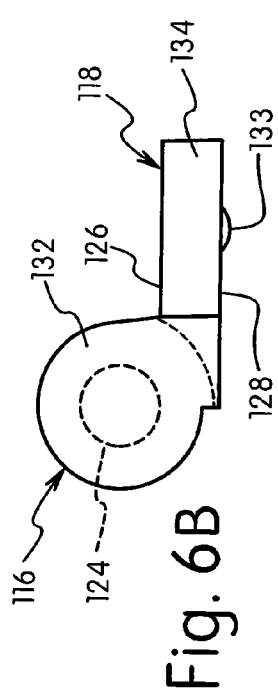
Figure 6C:
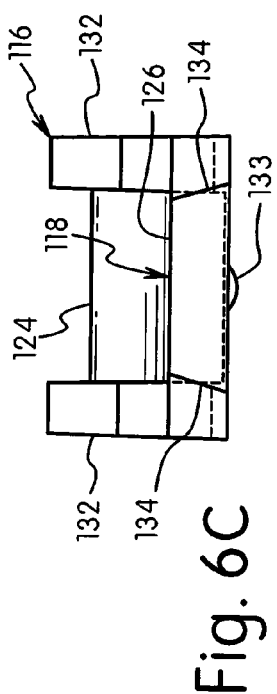

As shown in FIGS. 7A-7C the hinge barrel 146 has a substantially inverted J-shape that extends upwardly from the hinge leaf 122. In the embodiment shown the hinge barrel 146 has a leg 148 extending perpendicular to the plane of the hinge leaf 122 and terminating at a semicircular hook shaped portion 150. The hook portion 150 has an end 152 spaced from the leg 148 a distance to enable the hinge pin 124 to be inserted into the cavity of the hinge barrel and to retain the hinge pin in the opening defined by the hook portion 150. In a preferred embodiment of the invention, the hinge member 110 is made of a suitable plastic material so that the hinge pin 124 can snap into the opening in the hook portion 150. Preferably, the hook portion 150 captures the hinge pin 124 with sufficient force to resist separation of the pin 124 and hook portion 150. In a preferred embodiment, the gap in the hook portion 150 is oriented such that when the hinge member is coupled to the cover and base, the hinge pin cannot be separated from the hinge barrel without first disassembling the hinge member from the cover and the base.

The space between the end of the hook portion 150 and the leg 148 of the hinge leaf 122 is generally provided for manufacturing and ease of assembly although the hinge barrel can completely encircle the hinge pin to prevent disassembly. In the embodiment illustrated, a tab 154 extends from the hook portion 150 to define the end 152 and has a width less than the main portion of the hook portion 150. The tab 154 has a width to enable the tab 154 to flex during the assembly of the hinge pin 124 and the hinge barrel 146 and resist or prevent separation.

A pair of spaced apart braces 156 is provided that extends from the hinge leaf 122 to the leg 148 of the hook portion 150. An opening in the leg 148 is shown between the parallel braces 156. The braces 156 are formed with a top surface that are inclined with respect to the hinge leaf 122 to form a stop member to limit rotation of the first hinge portion 116 with respect to the second hinge portion 118.

In the embodiment shown, the first hinge leaf 118 and second hinge leaf 122 have a width that are different so the one hinge portion is adapted for coupling to the base 12 and the other hinge portion is adapted for coupling to the cover member 16. In this manner the orientation of the hinge member is determined by the respective coupling members on the base and cover member. In an alternative embodiment, the hinge portions can have the same dimensions to be interchangeable with the cover member and the base.

The coupling member 112 of the cover member 16 in the embodiment shown is provided on the side and facing outwardly. In the illustrated embodiment, two such coupling members 112 are provided. The coupling member 112 has two spaced apart ribs 158 that extend upwardly substantially perpendicular from the plane of the surface of the cover member 16 and form a slot having a longitudinal dimension extending in a plane substantially parallel to the surface of the cover member. The ribs 158 have an outer side 160 and an inclined inner side edge 162 to form a dovetail-like slot opening 164. The dovetail slot has a shape and dimension to complement the shape and dimension of the corresponding hinge leaf so the hinge leaf can mate by sliding into the dovetail slot. A recess 166 is provided on the side wall on the cover member 16 between the ribs 158 of the coupling member 112 and is positioned to mate with the detent on the bottom surface of the respective hinge leaf. The recess and detent have a shape and dimension to mechanically couple the respective hinge leaf to the coupling member 112 of the cover member and resist separation once assembled.

The base 12 includes coupling members 114 that complement the shape and dimension of the respective hinge member 110. In the embodiment shown, each coupling member 114 is substantially the same as coupling members 112 and includes two spaced apart ribs 168 having an outer surface 170 and inclined inner surface 172 to form a dovetail slot 174 or opening substantially the same as on the base. The dovetail slot 174 complements the outer shape of the respective hinge leaf to couple the hinge leaf to the cover member.

Other fastener mechanisms can also be used to fasten the hinge leaf to the coupling members. For example, the recess and detent can be reversed such that the detent is on the cover member and the recess is in the hinge member. Other fasteners include screws, pins, snap couplings, interference couplings, friction couplings, adhesives, and the like. For example, L-shaped ribs can be used to define the coupling members that mate with a complementing shape of a hinge member. The members can have barbs or expandable legs that engage the coupling member to resist separation after assembly. The coupling mechanism as shown includes male and female members that mate together where the hinge leaf forms the male member and the dovetail slot on the base forms the female member. Alternatively the male member can be formed on of the base and the hinge leaf can include a female member. In this embodiment, a dovetail extends from the base and cover member which mate with a dovetail shaped slot on the hinge member.

In use, cover assembly 10 is typically supplied as a kit with a base 12, the cover 16 and at least two hinge members 110. The desired orientation of the cover assembly and the location of the hinges are determined. In the embodiment shown, base 12 includes a base plate 11 and a body which are snapped together. The hinge members 110 are then inserted into the coupling members on the cover member and the body along the desired side to enable the cover member to pivot relative to the body in the selected orientation. Typically the hinge members are located so the pivot axis of the hinge member is substantially horizontal so that the cover member will close by gravity. The hinge member are slid into the respective dovetail slot and snapped into position by the mating of the detent on the hinge member and the recess on the cover member and body.

In the embodiment of the invention illustrated, the hinge members are coupled to the outer side surfaced of the base and cover member. Although generally it is preferred to couple the hinge member to the outer side surface for convenience of assembly, the hinge members can be positioned in other suitable locations to provide the hinged coupling of the cover member and the base. For example, the hinge members can attach to opposing faces between the cover member and the base, a top and bottom surface of the cover member and base, respectively, or to inner surfaces of the cover member and the base.

In one embodiment, the base 12 has a planar shape forming a cover plate for an electrical device such as a duplex receptacle. In this embodiment the base has a small side or edge surface defined by the thickness of the plate member and has top surface and a bottom planar surface. The hinge members can be adapted for coupling the top surface of the base by suitable coupling members. In other embodiments the hinge members can be coupled to the bottom surface of the base. In a similar manner the hinge members can be adapted for coupling to an inner surface, a top surface or bottom surface of the cover member. The hinge members can also be coupled to different locations of the cover member and the base provided the location does not interfere with the pivoting movement of the cover member with respect to the base. For example, the hinge member can be coupled to an outer surface of the cover member and to a top or inner surface of the base.

The cover assembly of the invention has at least one hinge member for coupling with the cover member and the base. In the embodiment illustrated, two hinge members are included for each side to provide adequate strength for the hinge connection between the cover member and the base. In other embodiments, a single hinge member can be used or more than two hinge members can be used depending on the dimensions of the cover member and the base.

While various embodiments have been chosen to illustrate the invention, it will be understood by those skilled in the art that various changes and modifications can be made by one of ordinary skill in the art without departing from the spirit and scope of the invention as defined in the appended claims.

What is claimed is:

1. A cover assembly for an electrical device, said cover assembly comprising:
   a base including a base plate for coupling to an electrical box and having an opening for an electrical device, and a housing coupled to said base plate and having a side wall and an open top end, said side wall having a first side portion having at least one first coupling member integrally formed with and extending outwardly from a side surface thereof and an adjacent second side portion having at least one second coupling member integrally formed with the side wall and extending outwardly from a side surface thereof;
   a cover member cooperating with said base, said cover member having a first side portion having at least one first coupling member extending from a side surface thereof and a second side portion having at least one second coupling member extending from a side surface thereof; and
   a hinge member having a first hinge portion and a second hinge portion pivotally connected together, said first hinge portion having an end for coupling with said first coupling member or said second coupling member of said base, and said second hinge portion having an end for coupling with said first coupling member or said second coupling of said cover member.

2. The cover assembly of claim 1, wherein said cover member has a side wall defining said first and second side portions, and where said first and second coupling members on said cover member extend outwardly from an outer surface of said side wall.

3. The cover assembly of claim 1, wherein said first and second coupling members on said base have a longitudinal open slot lying in a plane extending substantially parallel to said respective outer surface of said base.

4. The cover assembly of claim 3, wherein said first and second coupling members on said cover member have a longitudinal open slot lying in a plane extending substantially parallel to said respective outer surfaces of said cover member.

5. The cover assembly of claim 1, wherein said first hinge portion has a first dimension for mating with said coupling members on said base, and said second hinge portion has a second dimension for mating with said coupling members on said base and where said second dimension is different from said first dimension.

6. The cover assembly of claim 1, wherein said first and second coupling members of said base define an opening having a longitudinal axis extending substantially parallel to the plane of said side wall of said base and where said first hinge portion and said second hinge portion have a longitudinal dimension to be received in said openings.

7. The cover assembly of claim 1, wherein said hinge member is adapted to be coupled to said cover member and to said base by a dovetail connection.

8. The cover assembly of claim 1, wherein said first and second coupling members of said housing define a dovetail slot extending parallel to said side wall and said first hinge portion has a dovetail shape complementing said dovetail slot; and
said first and second coupling members of said cover member define a dovetail slot extending parallel to said side portion and said second hinge portion has a dovetail shape complementing said dovetail slot.

9. The cover assembly of claim 8, wherein
said first hinge portion has a fastener member for fastening said first hinge portion to said first and second coupling members of said cover member and to resist separation of said first hinge portion from said coupling members; and
said second hinge portion has a fastener member for fastening said second hinge portion to said first and second coupling members of said base and to resist separation of said second hinge portion from said coupling members.

10. The cover assembly of claim 9, wherein said fastener members on said first and second hinge portions is a detent extending from a surface of said first and second hinge portions, and wherein said dovetail slot in said coupling members of said base and said cover member include a recess for mating with said detent.

11. The cover assembly of claim 1, wherein said first and second coupling members are integrally formed on an outer surface of said base and cover.

12. The cover assembly of claim 11, wherein said ribs extend parallel to an outer surface of said base and said cover, and said first and second hinge portions have a longitudinal dimension extending parallel to said outer surface of said base and cover.

13. The cover assembly of claim 1, wherein said first and second coupling members of said base and said cover comprise two spaced apart ribs defining a slot therebetween, and where said first hinge portion and said second hinge portion have a dimension to slide into said respective slot.

14. The cover assembly of claim 13, wherein
said ribs have an inclined inner surface whereby said slot has a dovetail shape, and
said first hinge portion and second hinge portion have inclined side edges to define a dovetail shape.

15. A cover assembly comprising:
a base having a top end, a bottom end, a first side and a second side oriented substantially perpendicular to said first side, said first side having at least one slot extending parallel to a plane of said first side, and a second side having at least one slot extending parallel to a plane of said second side;
a cover member having a shape complementing a shape of said base and having a first side with at least one slot on an outer surface and lying in a plane of said first side and a second side with at least one slot on an outer surface lying in a plane of said second side, said second side being oriented substantially perpendicular to said first side; and
a hinge member having a first portion and a second portion pivotally connected together,
wherein said first portion is adapted for selectively coupling to either said slot on said first side of said base or to said slot on said second side of said base; and
wherein said second portion is adapted for selectively coupling to either said slot on said first side of said cover member or to said slot on said second side of said base, whereby said cover can pivot with respect to said base along said first side of said cover and said first side of said base or along said second side of said cover and said second side of said base.

16. The cover assembly of claim 15, wherein said at least one slot on said base and said at least one slot on said cover member is a dovetail shaped slot extending substantially parallel to said first and second sides of said base and said first and second sides of said cover; and said first and second portions of said hinge member have a dovetail shape.

17. The cover assembly of claim 15, wherein said first and second portions of said hinge member include a fastener member for fastening said first and second portions of said hinge members to a respective slot on said base and cover member.

18. The cover assembly of claim 15, wherein said first and second portions of said hinge have a planar surface with a detent extending therefrom, and said slots in said cover and base have a planar surface with a recess for mating with said detent.

19. The cover assembly of claim 15, wherein said slots on said first side and second side of said base are the same, and said slots on said first side and second side of said cover member are the same, and said hinge member is interchangeable with said first slot and second slot of said base and cover member.

20. The cover assembly of claim 15, wherein said first side and second side of said base and said first side and second side of said cover member each have two spaced apart slots for receiving a hinge member; and two of said hinge members being interchangeable with said slots on said first side and second side of said base and cover member to pivot said cover member about a first axis parallel to said first side of said base or to pivot said cover member about a second axis perpendicular to said first axis and parallel to said second side of said base.

21. The cover assembly of claim 20, wherein said slots on said first side and second side of said base have a dovetail shape;

said slots on said first side and second side of said cover member have a dovetail shape;

said first portion and second portion of said cover member have a dovetail shape; and said first portion and second portion having a detent received in a recess in said slot for coupling said hinge members to said base and cover member.

* * * * *